Dec. 15, 1931.     W. STUEBING, JR     1,836,885
SKID
Original Filed Dec. 21, 1926

Inventor
William Stuebing Jr.
By his Attorneys
Emery Booth Janney & Varney

Patented Dec. 15, 1931

1,836,885

UNITED STATES PATENT OFFICE

WILLIAM STUBBING, JR., OF CINCINNATI, OHIO, ASSIGNOR, BY MESNE ASSIGNMENTS, TO THE YALE & TOWNE MANUFACTURING COMPANY, OF STAMFORD, CONNECTICUT, A CORPORATION OF CONNECTICUT

SKID

Application filed December 21, 1926, Serial No. 156,103. Renewed September 3, 1931.

The present invention relates to portable skids or platforms of the type used in manufacturing plants for supporting loads to be transported on lifting trucks and has for an object to provide a skid which can be economically and expeditiously manufactured and to provide an improved method of manufacturing the skid.

Skids of this character are used in large numbers and it is important that the cost of manufacture thereof shall be as low as possible.

The most extensively used form of skid now on the market comprises a wooden floor made up of a number of transversely extending boards and longitudinally extending upper and lower angle bars on each side of the floor secured together to form trusses to sustain the load and to bind together the boards. These angle bars are adjustable toward each other in assembling the skid and, therefore, readily accommodate the thickness of the boards which, for this reason, do not require special fitting. The angle bars are adapted also so to hold together the boards that boards of random widths can be used thus making it possible very materially to economize in the cost of lumber as compared with skids requiring boards of uniform width.

The present invention provides a skid having many of the advantages of the above described double angle bar truss skid and in addition certain advantages resulting from the new structure. The skid of the present invention has upper and lower truss members, the arrangement being such that these members can be adjustable toward each other in the assembling of the skid to accommodate the thickness of the boards, and in the finished skid can be integrally connected to form rigid trusses. The upper and lower truss members are preferably welded together throughout substantially their whole length. This arrangement provides a structure requiring less metal than the skid herein first described. In the finished structure stresses of the load acting downwardly are resisted by a horizontal flange reenforced by a vertical flange, and the stresses of the lifting truck acting upwardly are also resisted by a horizontal flange reenforced by a vertical flange; but in the present arrangement the connected structure provides in effect one vertical flange which reenforces both the upper and the lower horizontal flanges. This arrangement, while economizing metal, yet in the assembling operation permits the horizontal flanges to be adjusted relative to each other to accommodate the thickness of the particular boards used.

It has been proposed heretofore to use made-up channel bars as side members in the constructure of skids but this requires fitting of the boards to the exact width of the channel and therefore increases the cost of the labor of manufacture. Channels of the desired shape are also difficult to manufacture. If they are rolled in the usual manner the channel is tapered because of the necessary clearance of the channel-forming rolls and it is then necessary to fit the boards into the tapered channel. If the channels are made by folding a flat blank the cost of manufacture of the channels is increased. The arrangement of the present invention avoids the necessity of specially fitting the ends of the boards and permits the use of boards of any desired thickness. The metal members and boards can be expeditiously assembled to clamp the boards tightly in place. The present invention provides, also, in the preferred embodiment, an arrangement wherein the metal members entirely surround the floor members thereby confining the floor members entirely within the complete unitary frame.

Referring to the drawings forming a part hereof:

Figure 1:
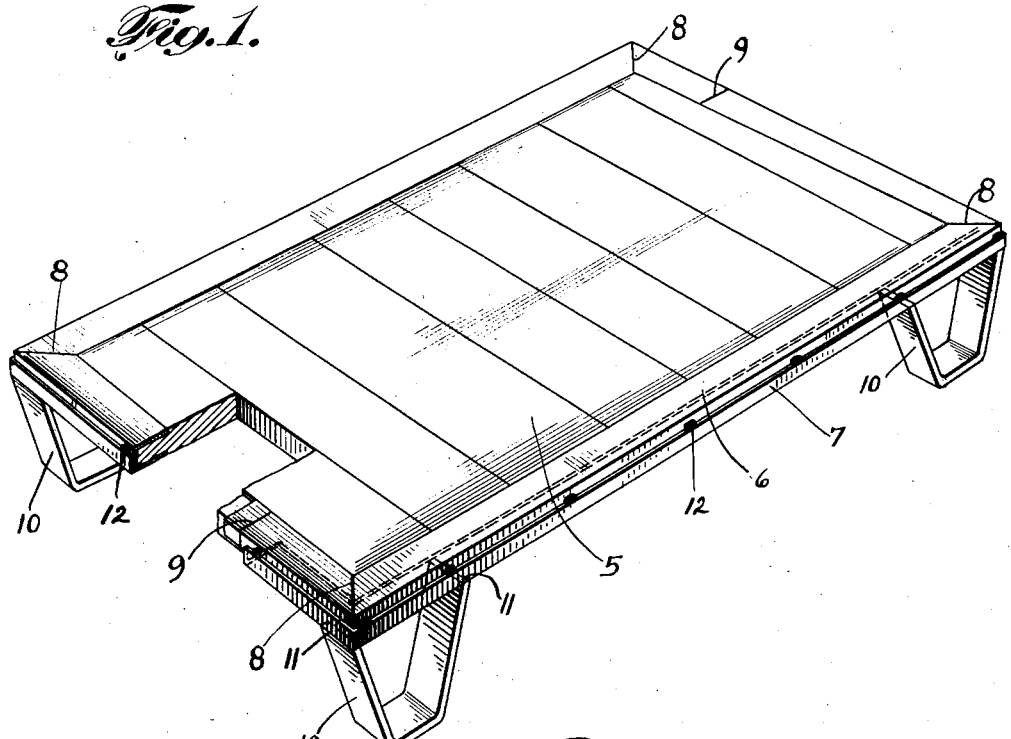
Figure 1 is a perspective view of a skid embodying the invention.
Figure 2:
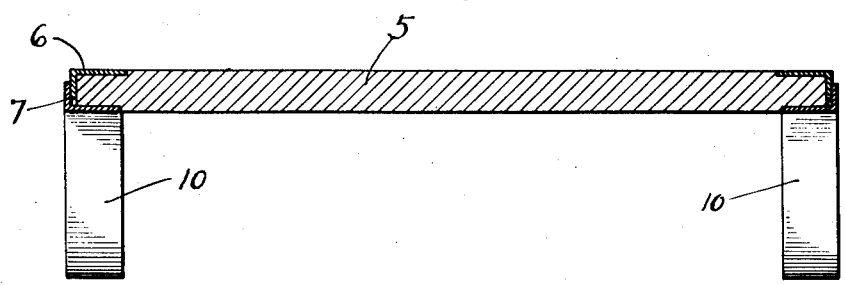
Figure 2 is a transverse sectional view of the same.
Figure 3:
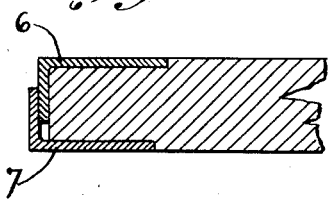
Figure 3 is a sectional detail view showing the welded truss members.

The skid to be described for the purpose of illustrating the invention has a floor which may comprise either one unitary member such as a composite board or parallel floor members such as boards 5, together with a unitary metal frame reenforcing the same and, in the case of separate boards, binding them together.

If the floor boards 5 extend transversely of the skid as shown in the drawings, the side members of the metal frame act as load sustaining trusses. These trusses each consist of an upper angle bar 6, the horizontal flange of which bears against the tops of the boards and the vertical flange of which overlies the ends of the boards, and a lower angle bar 7, the horizontal flange of which engages the lower faces of the boards and the vertical flange of which overlies the ends of the boards and also preferably overlies the vertical flange of the upper angle bar and is securely welded thereto in the process of assembling the skid. The arrangement wherein the vertical flanges of the two angle bars overlap and are welded together substantially continuously throughout the whole length thereof is preferred to an arrangement in which the flanges abut each other and are welded together, for the reason that the welding operation can be performed more satisfactorily in the arrangement first described.

In the construction shown in the drawings the angle bars are continued around the ends of the skid floor to form one continuous frame completely confining the boards. As shown the frame members consist of angle bars which are cut to facilitate bending at the corners and are bent at right angles to form the corners of the skid. The meeting edges of the horizontal flanges are then welded together along the line indicated at 8 in Figure 1. The upper frame member may conveniently consist of two bars bent to U shape the abutting ends of which are welded together as indicated at 9, and the lower frame member may be similarly formed but with the joints staggered relative to the joints of the upper frame member. In the finished structure, the two vertical flanges of the upper and lower angle bars when welded together either at spaced points 12 or continuously form in effect one vertical flange which cooperates with both horizontal flanges to resist bending stresses applied thereto by the lift truck acting upwardly on the floor members or by the load pressing downwardly on the floor members.

Legs 10 may be welded to the trusses at 11 or may be otherwise secured if permanently connected legs are desired.

In assembling the skid one frame member may be supported on a suitable assembling bench and the boards 5, which may be of random widths, laid in. The rest of the frame and the legs may then be assembled and secured. If the legs are welded in position the end portions of the frame serve as tie members to connect the trusses and so prevent them from separating from each other and from the boards 5. If the legs are bolted in position the boards may be drilled and the legs applied and bolted in position while the trusses and boards are held in assembled relation in the frame. It will be understood that the upper and lower angle bars may conveniently be punched or drilled to receive the leg bolts previously to the assembly of the skid.

The foregoing description of a particular embodiment is illustrative merely and is not intended as defining the limits of the invention.

I claim:

1. A portable skid comprising a floor made up of transversely extending floor members and a metal frame entirely surrounding said floor consisting of upper and lower members spaced apart an adjustable minimum as determined by the thickness of the floor boards, and welded together substantially as described.

2. A portable platform comprising floor members, side members of channel shape embracing the ends of said floor members, fabricated from associated metal angle bars having their horizontal flanges engaging respectively the upper and under faces of said floor members and their vertical flanges overlapped and welded together and transverse metal girders connected at their ends to the respective channels to form an integral frame.

3. A portable platform comprising floor members, side members of channel shape fabricated from associated angle bars having their vertical flanges welded together longitudinally in such manner as to cause the horizontal flanges thereof closely to engage the upper and under faces of the end portions of the floor members.

4. A portable platform comprising floor members, side members of channel shape fabricated from associated angle bars having their vertical flanges welded together longitudinally in such manner as to cause the horizontal flanges thereof closely to engage the upper and under faces of the end portions of the floor members, and transverse metal members for reinforcing the ends of said platform welded to the unitary side reinforcing body formed by each of said welded pair of angle members.

5. A portable platform comprising floor members, a series of reinforcing members of channel shape fabricated from associated angle bars having their vertical flanges welded together in such manner as to cause the horizontal flanges thereof to closely engage the upper and under faces of the floor members, the respective upper and lower horizontal flanges of said members being welded to one another so as to form a continuous integral frame for said platform.

6. A portable skid comprising a floor made up of transversely extending floor members and longitudinally extending trusses binding together the ends of the floor members, each truss comprising a pair of independent angle bars having parallel vertical flanges for protecting the sides of the skid periphery, and parallel horizontal flanges for protecting the top and bottom of the skid floor adjacent the peripheral edge thereof, said horizontal flanges being spaced apart an adjustable minimum determined by the thickness of the floor, said bars being welded together at spaced points to securely maintain the skid floor members and said angle bars in assembled relation.

7. A portable platform comprising floor members and longitudinally extending trusses binding together the ends of the floor members, each truss comprising a pair of structural members resting respectively on the bottom and top sides of said floor members and having portions thereof adapted for sliding engagement at points determined by the thickness of said floor members, said structural members being welded together at said points of sliding engagement to form an integral side frame for said platform.

8. A portable platform comprising floor members, side members of channel shape fabricated from associated angle bars having their vertical flanges welded together longitudinally in such a manner as to cause the horizontal flanges thereof closely to engage the upper and under faces of the end portions of the floor members and transverse metal girders welded to the respective ends of the channels bars to provide an integral frame and to protect the ends of the floor.

9. A portable platform comprising floor members, side members of channel shape embracing the ends of said floor members, fabricated from associated metal angle bars having their horizontal flanges engaging respectively the upper and under faces of said floor members and their vertical flanges overlapped and welded together and transverse metal girders welded at their ends to the respective channels to form an integral frame.

10. A portable platform, comprising floor members, side members of channel-bar construction embracing the ends of the floor members formed of associated angle bars having their vertical flanges over-lapped sufficiently to cause their horizontal flanges to engage respectively the upper and under faces of said floor members with said vertical flanges welded together at intervals along the overlapped edges, U-shaped legs underlying and welded to the lower flanges of the channel bars and transverse angle-bar girders welded at their ends to the respective channel-bars embracing and protecting the lower edges of the end floor members.

In testimony whereof, I have signed my name to this specification this 15th day of December, 1926.

WILLIAM STUEBING, Jr.